No. 807,898. PATENTED DEC. 19, 1905.
W. E. BAKEMAN.
POTATO PLANTER.
APPLICATION FILED JULY 28, 1905.
2 SHEETS—SHEET 1.
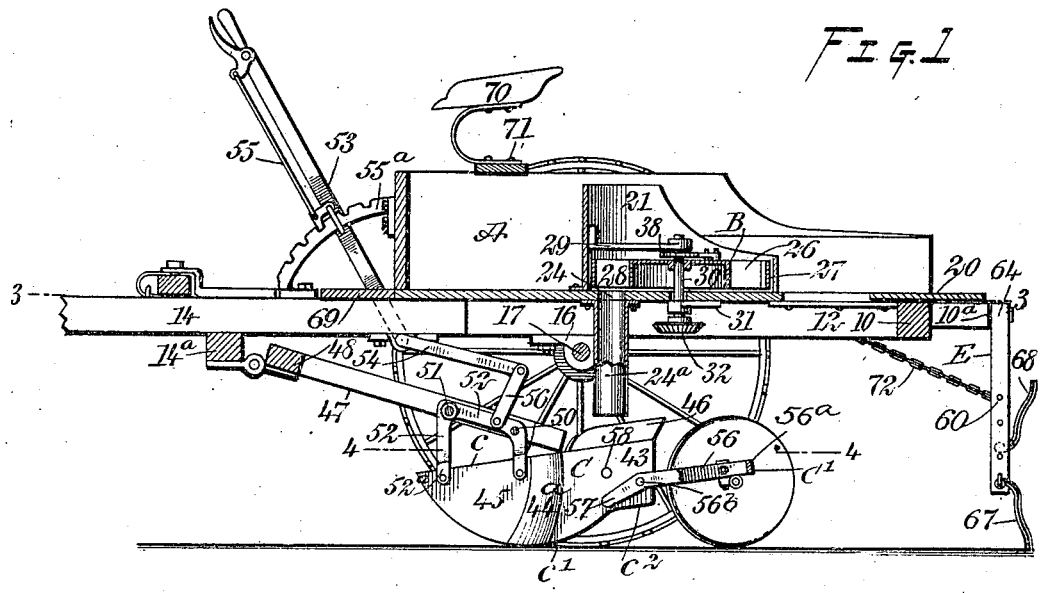
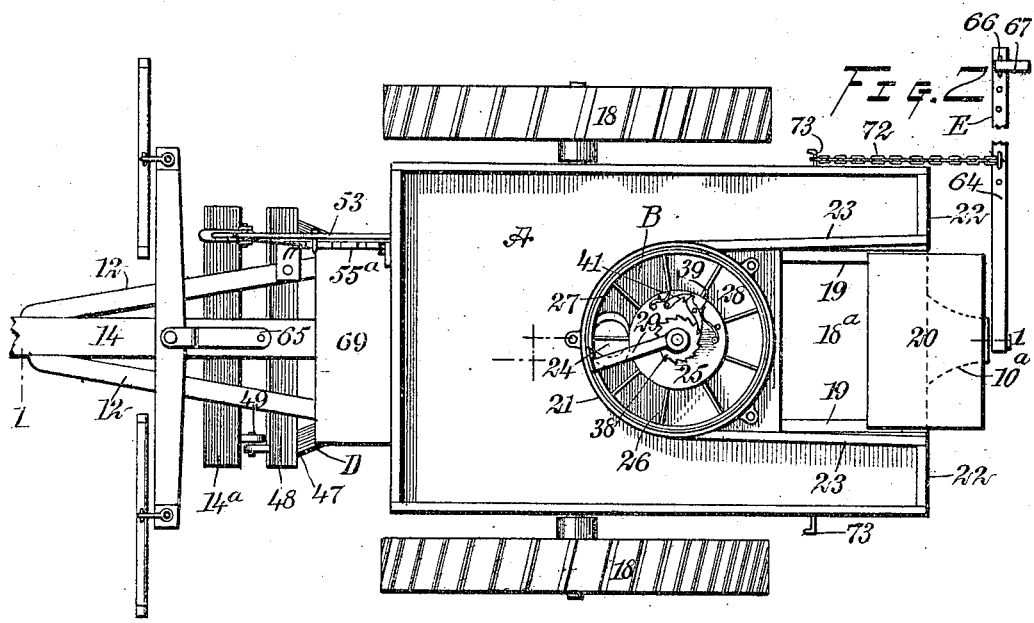
WITNESSES:
INVENTOR
Winfred Ernest Bakeman
BY
ATTORNEYS

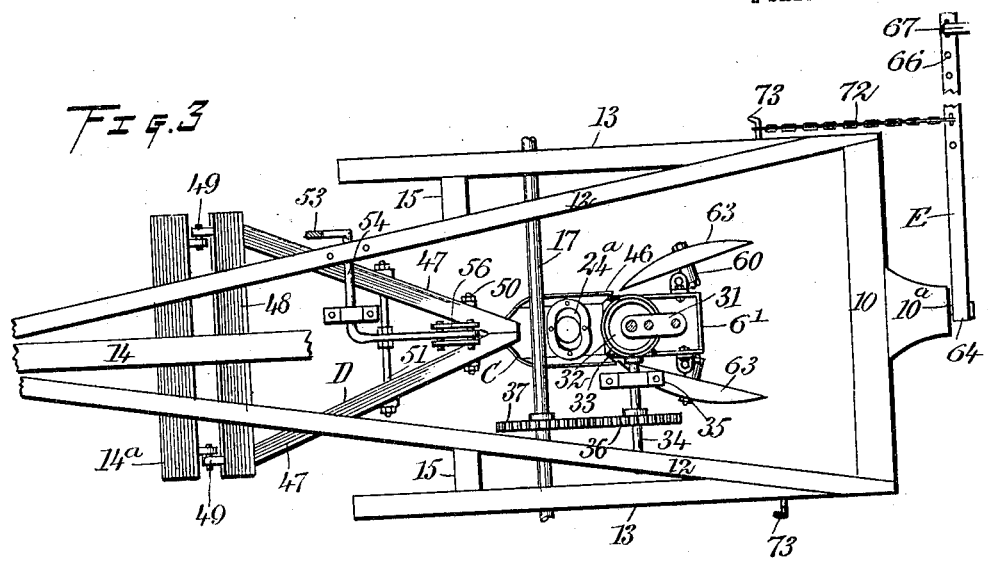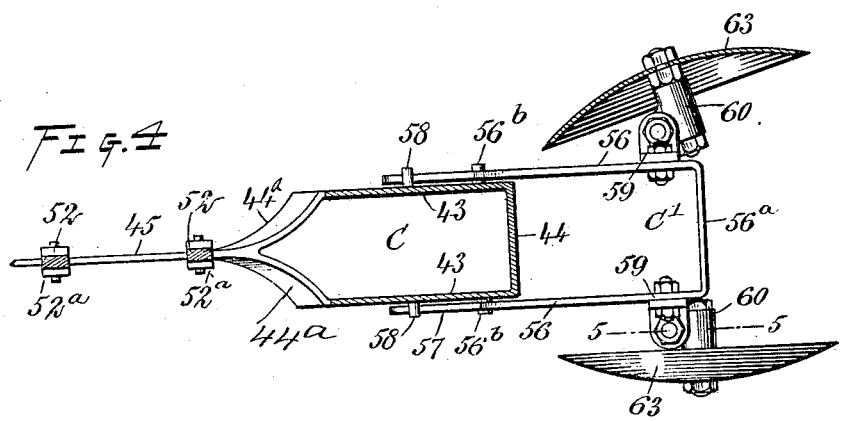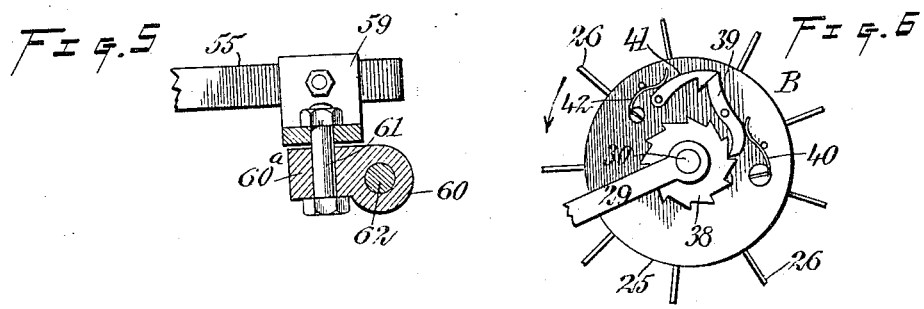

UNITED STATES PATENT OFFICE.

WINFRED ERNEST BAKEMAN, OF SNOHOMISH, WASHINGTON.

POTATO-PLANTER.

No. 807,898.          Specification of Letters Patent.          Patented Dec. 19, 1905.

Application filed July 28, 1905. Serial No. 271,648.

*To all whom it may concern:*

Be it known that I, WINFRED ERNEST BAKEMAN, a citizen of the United States, and a resident of Snohomish, in the county of Snohomish and State of Washington, have invented a new and Improved Potato-Planter, of which the following is a full, clear, and exact description.

The purpose of the invention is to provide a simple, economic, and automatically-operating machine for planting potatoes so constructed that there is absolutely no liability of injury to the seed during the planting operation.

Another purpose of the invention is to provide a furrow-opener of box-like construction into which the seed-potatoes drop in their passage to the furrow, which furrow-opener is so shaped that it does not clog or gather sod in soddy ground and so that it will make a V-furrow, thereby lessening the liability of the potatoes rolling or bounding out of place.

A further purpose of the invention is to provide a hinged support for the furrow-opener and to locate said opener or plow directly in line with the portions of the wheels contacting with ground, which is a great advantage in uneven ground, as there is less liability of planting to an uneven depth.

It is also a purpose of the invention to provide covering-disks, the supports whereof are pivotally mounted upon the furrow-opener or plow, so that the disks will rise and fall automatically, which is a great advantage in rough ground, and to so mount the disks upon their supports that they may be adjusted to cover the potatoes any desired depth.

Another purpose of the invention is to provide a single lift-lever for the plow or furrow-opener and the disk coverers, so that the two latter-named elements are raised and lowered together.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a vertical longitudinal section through the machine, the section being taken practically on the line 1 1 of Fig. 2. Fig. 2 is a plan view of the machine. Fig. 3 is a horizontal section taken on the line 3 3 of Fig. 1 looking downward. Fig. 4 is a horizontal section taken practically on the line 4 4 of Fig. 1 and looking downward. Fig. 5 is a detail side elevation of the support for the covering-disk, the section being taken on the line 5 5 of Fig. 4; and Fig. 6 is a plan view of a portion of the seed-drop wheel drawn upon an enlarged scale.

The frame of the machine is best shown in Fig. 3 and consists of a rear cross-bar 10, diagonal intermediate bars 12, and side bars 13. The intermediate diagonal bars 12 extend from the ends of the rear bar 10 forwardly in direction of each other beyond the forward end of the side bars 13, and where the said diagonal bars converge at their forward ends they receive between them the rear end of the pole or tongue 14 and are suitably secured thereto. Where the pole enters between the said diagonal bars 12 a cross-bar $14^a$ is secured to their under faces. Finally, in the construction of the frame brace-blocks 15 are located between the forward portions of the side bars 13 and the opposing portions of the diagonal bars 12. The frame is provided with an axle 17, journaled in suitable bearings 16, secured to the side bars 13, and the said axle is free to turn in the said bearings and is provided with suitable wheels 18, secured at its ends, so that as the machine moves over the ground the axle 17 is revolved. The wheels 18 have very wide tires, so as to travel easy.

The frame just described supports a body A, and the said body at its rear portion is provided with an opening $18^a$. At each side of this opening a way 19 is formed, upon which ways a seat 20 is adapted to slide, and when the seat is not in use it covers the opening $18^a$. At the central portion of the body A a circular frame 21, open at top and bottom, is secured to the bottom portion of the said body, the forward portion of which frame is higher than its rear portion, as shown in Fig. 1, and backboards 22 extend from the sides of the body to the open portion $18^a$, where they meet longitudinal division-boards 23, which latter boards extend to the casing 21. The box-body A is adapted to carry the seed-potatoes.

A seed-drop wheel B is mounted to turn in the casing 21. This seed-drop wheel consists of a quite large flat hub 25, flat spokes 26, which radiate from the said hub, and a rim 27, secured to the said spokes. The spokes 26 are quite wide, and the spaces between them constitute open pockets 28, normally closed at their lower portions by the bottom of the body A. At a point within the circle of the seed-drop wheel and forward of its hub an opening 24 is made in the bottom of the body A, so that as the seed-drop wheel revolves and as one pocket after the other is brought opposite the opening 24 the contents of the said pocket will drop out through the opening.

A bracket 29 is secured to the inner forward face of the casing 21, as is shown in Figs. 1 and 2, and in this bracket the upper end of a vertical shaft 30 is mounted to turn, and said shaft passes loosely through the hub of the seed-feeding wheel and down through an opening in the bottom of the box-body A and also through a lower bracket 31, secured to the under face of the said box-body, and at the lower end of this shaft 30 a bevel-gear 32 is secured. This bevel-gear 32 meshes with the bevel-gear 33, secured upon the inner end of the shaft 34, journaled in a bearing 35, adapted for attachment to the box-body, and also in a bearing on the bottom of one of the diagonal intermediate bars 12, as is shown in Fig. 3, and the shaft 34 is provided with a gear 36, which meshes with a gear 37 on the axle 17. Thus as the axle is turned by the movement of the machine along the ground motion is communicated to the shaft 34 and from the shaft 34 to the shaft 30. The said shaft 30 in its turn communicates rotary motion to the seed-drop wheel B. This is accomplished in the following manner and as is best shown in Figs. 2 and 6, wherein it will be observed that a ratchet-wheel 38 is secured to the shaft 30 and a centrally-pivoted dog 39 has one end in engagement with the teeth of the ratchet-wheel, the said dog being held in such position by a spring 40. The head portion of a latch 41 engages with the other end of the dog, the said latch being held in such position by a spring 42. The springs 40 and 42, the dog 39, and latch 41 are all carried upon the upper face of the hub 25 of said seed-drop wheel. When it is desired to turn the seed-drop wheel as described, the dog and latch are in the position shown in Fig. 6; but when it is desired to render the seed-drop wheel silent while the machine is in motion it is simply necessary to carry the outer end of the dog 39 toward the ratchet-wheel until it engages with the latch 41 beyond its head, whereupon the latch will serve to hold the dog 39 out of engagement with the ratchet-wheel 38, and said wheel and the shaft 30 will have no influence on the seed-drop wheel.

The plow or furrow-opener C, which is best shown in Figs. 1 and 4, is of box-like formation, open at the top and at the bottom, and consists of parallel sides 43, a back 44, and an angular front comprising two front side members 44$^a$, which extend from the forward ends of the main side members 43 and are connected at a line drawn centrally through the body of the plow. The said members 44$^a$ are concaved and are given an outward and downward and forward inclination, as is shown in Fig. 4, and a nose 45, consisting of a flat longitudinally-located bar, is made continuous with that portion of the front of the body where the members 44$^a$ are brought together, and this nose 45 acts as a pilot for the plow or furrow-opener proper and serves to prevent any obstructions from damaging the working front face of the plow. The upper line $c$ of the plow or furrow-opener is straight and is practically horizontal, while the lower portion of the plow from the point of the nose to a point somewhat back of the working front is convexed, as is shown in Fig. 1, and the other remaining portion of the said lower edge is straight, as is shown at $c^2$, and is at some distance from the ground. This plow is located longitudinally of the machine and is directly in line with the portions of the wheels 18 contacting with the ground, which is a great advantage in working in uneven ground, as there is thereby less liability of planting to an uneven depth. A fender 46, however, is located at the upper rear portion of the sides of the furrow-opener and at the rear end therof, and this fender is outwardly flared, and a spout 24$^a$ is secured at its upper end to the bottom of the body A around the opening 24, which spout extends down somewhat close to the plow, where the fender 46 is located, so as to deliver the seed-potatoes to the furrow at the fender-protected portion of the plow. This plow makes a V-furrow, and such a furrow is best adapted for the reception of the potatoes, as they are not liable to roll out therefrom. A V-support D is provided for the said plow or furrow-opener C. This support is best shown in Figs. 2 and 3 and consists of two bars 47, brought together at their rear ends over the nose-section 45 of the plow, being connected at their forward or diverging ends by a cross-bar 48, which cross-bar 48 is connected by hinges 49 with the forward cross-bar 14$^a$ of the frame. A bolt 50 is passed through the said V bar or beam D at its contracted end, as is shown in Fig. 3, and a second tie-bar 51 is passed through the members 47 of the beam nearer the front, as is also shown in Fig. 3. An inverted-U suspension-bar 52 is utilized to effect a direct connection between the beam D and the plow, the vertical members of which suspension-bar have their lower ends 52$^a$ bifurcated to straddle the upper edge of the nose 45 of the plow, to which they are attached by suitable bolts, as is shown in Figs. 1 and 4. The plow is raised and lowered by means of a hand-lever 53, located at the side of the frame and attached to a crank-shaft 54, the crank-arm of which extends rearwardly over the central portion of the supporting-beam D, as is shown in Fig. 3. The said crank-arm 54 is provided with links 56, pivoted thereto at its rear end, and the said links are pivotally attached to opposite sides of the suspension-bar 52, the said suspension-bar being held in place by the tie-bars 50 and 51. The lever 53 is provided with a thumb-latch 55, which operates upon a rack 55ª, located at the same side of the frame as the said lever 53.

A rectangular frame C', consisting of side bars 56 and a rear connecting-bar 56ª, is carried by the rear portion of the plow or furrow-opener C, the side bars 56 of the said frame being pivoted between their centers and forward ends by pins 56ᵇ at the sides of the plow C, and the forward end portions 57 of the side bars 56 of said frame C' are given a downward inclination, as is shown in Fig. 1, and pins 58 are located above the inclined forward portions of the said frame, as is also shown in Figs. 1 and 4, so that when the plow C is raised the frame C' is raised also, as when the rear end of the frame drops its forward end will engage with the upper pins 58. Angle-brackets 59 are secured to the outer faces of the side bars 56 of the frame C' near the rear end of the said frame, and the horizontal forwardly-extending shank portions 60ª of horizontal tubular bearings 60 are pivotally connected with the horizontal members of the said brackets by pins 61, provided with suitable nuts. Pins 62 are loosely passed through the bearings 60, and the pins carry disks 63 at their outer end portions, which disks are adapted to cover up the deposited seed. These disks by reason of their pivoted bearings may be adjusted so as to cause more or less earth to be covered over the seed.

A marker E is employed in connection with the machine, consisting of a bar 64, pivoted at its inner end upon an offset 10ª from the center of the rear cross-bar 10 of the frame, and said bar is provided with series of apertures 66. In connection with the said bar 64 two spring marking-fingers 67 are employed, located one at each side of the bar, and the said spring-fingers extend in opposite directions, so that one will be down and the other will be up when the marker is in operation, thus enabling the bar to be turned for operation either at the right or the left hand side of the machine, and these marking-fingers 67 and 78 are adjustable, as they are secured to the bar by suitable pins passed through the most convenient apertures 66 in the bar.

A platform 69 is located on the frame in front of the body A, upon which the driver may rest his feet, a seat 70 being provided for the driver, supported upon a cross-bar 71, extending across the top of the said body. When the marker is in position, a chain 72, attached to the bar E, is passed over a keeper 73, one of which is located at each side of the body at the rear.

Having thus described my invention, I claim as new and desire to secure by Letters Patent—

1. In potato-planters, a wheel-supported box-body adapted to contain the seed to be planted, a casing secured to the bottom of the body, the said body having an opening therein within said casing, a seed-drop wheel mounted to revolve within the said casing, having horizontal pockets open at top and bottom, which pockets are fed by hand, said pockets being arranged to successively pass over said opening, a shaft passed loosely through said wheel, a ratchet-and-pawl connection between the wheel and the shaft, and means for driving the shaft from the supporting-wheels of the machine.

2. In potato-planters, the combination with a wheel-supported body having a central opening in its bottom and a guarded opening at the rear of the said bottom, a seat slidably mounted at the rear opening and a casing located at the bottom of the body around the opening therein, a seed-drop wheel mounted to turn in the said casing, said wheel consisting of a flat hub, wide spokes radiating therefrom and a rim connected with the spokes, forming a series of pockets, which pockets as the wheel revolves are brought successively over the opening in the said body, a chute secured to the said body at the opening therein, a shaft mounted to turn in the body, being loosely passed through the hub of the said wheel, a ratchet-wheel secured on the upper portion of the shaft, a spring-controlled dog pivoted on the hub of the wheel for engagement with the ratchet-wheel, a latch for the said dog likewise carried by the said wheel, and a furrow-opener of box-like construction open at the front and bottom, which furrow-opener is below said chute, and means for driving the shaft from the axle of the machine.

3. In potato-planters, the combination with a wheel-supported body having a central opening in its bottom and a guarded opening at the rear of said bottom, a seat slidably mounted at the rear opening, and a casing located at the bottom of the body around the opening therein, of a seed-drop wheel mounted to turn in the said casing, said wheel consisting of a flat hub, wide spokes radiating therefrom and a rim connected with the spokes, forming a series of pockets, which pockets as the wheel revolves are brought successively over the opening in the said body, a chute secured to the said body at the opening therein, a shaft mounted to turn in the body, being loosely passed through the hub of the said wheel, a ratchet-wheel secured on the upper portion of the shaft, a spring-controlled dog pivoted on the hub of the wheel for engagement with the ratchet-wheel, a latch for the said dog likewise carried by the said wheel, a furrow-opener of box-like construction open at the front and bottom, which furrow-opener is below the said chute, means for raising and lowering the said furrow-opener, a frame carried by the rear portion of the opener, and adjustable disk coverers carried by the said frame.

4. In potato-planters, a wheel-supported frame, a seed-delivery mechanism carried by the frame, a furrow-opener of box-like construction which receives the seed from the seed-delivering mechanism, the said furrow-opener having an angular front, the members whereof are concaved and downwardly and forwardly inclined, a flat nose extending from the forward central portion of the said furrow-opener, a supporting-beam hinged to the said frame, suspension-bars connected with the frame and with the nose of the said furrow-opener, having its lower edge convexed from the point of its nose to a point to the rear of the forward portion of the body, the remaining lower portion of the furrow-opener being straight, a lift-lever, a locking device therefor, and link-and-shaft connections between the said lift-lever and the suspension-bar attached to the said furrow-opener.

5. In potato-planters, a wheel-supported frame, a seed-delivery mechanism carried by the frame, a furrow-opener of box-like construction which receives the seed from the seed-delivering mechanism, the said furrow-opener having an angular front, the members whereof are concaved and downwardly and forwardly inclined, a flat nose extending from the forward central portion of the said furrow-opener, a supporting-beam hinged to the said frame, suspension-bars connected with the frame and with the nose of the said furrow-opener, said furrow-opener having its lower edge convexed from the point of its nose to a point to the rear of the forward portion of the body, the remaining lower portion of the said furrow-opener being straight, a lift-lever, a locking device therefor, link-and-shaft connections between the said lift-lever and the suspension-bar attached to the said furrow-opener, a frame pivotally attached to the rear side portions of the furrow-opener, the forward ends of the frame being downwardly inclined, stop-pins located on the furrow-opener above the forward ends of the frame, brackets carried by the said frame, bearings pivotally mounted on the said brackets, and disk coverers carried by the said bearings, whereby the furrow-opener and the covering-disks may be raised or lowered together.

6. In a potato-planter, the combination with a wheel-supported body and a seed-distributing mechanism therefor, of a box-like furrow-opener receiving seed from the said mechanism, having its forward lower portion convexed, its rear lower portion straight and the body of said furrow-opener having a triangular forward working surface, the members whereof are concaved and inclined downwardly and forwardly, the said body being also provided with a straight nose extending forwardly from its central portion, a V supporting-beam pivoted to the said frame, tie-bars passed through the members of said beam, a suspension-bar carried by the tie-bars and secured to the nose portion of the furrow-opener, a lift-lever, a shaft on which the lift-lever is attached, the shaft being provided with a crank-arm, and link connections between said crank-arm and the suspension-bar, whereby the furrow-opener may be raised and lowered and is held in line with the bottom portion of the supporting-wheels of the machine.

In testimony whereof I have signed my name to this specification in the presence of two subscribing witnesses.

WINFRED ERNEST BAKEMAN.

Witnesses:
VAY STEWART,
ROBERT M. FOLSOM.